(12) United States Patent
Honma (10) Patent No.: US 10,457,212 B2
(45) Date of Patent: Oct. 29, 2019

(54) VEHICLE PILLAR STRUCTURE

(71) Applicant: TOYOTA JIDOSHA KABUSHIKI KAISHA, Toyota-shi (JP)

(72) Inventor: Nobutaka Honma, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/156,167

(22) Filed: Oct. 10, 2018

(65) Prior Publication Data

US 2019/0161009 A1    May 30, 2019

(30) Foreign Application Priority Data

Nov. 24, 2017    (JP) ................................ 2017-226233

(51) Int. Cl.
    *B60R 1/00*          (2006.01)
    *B62D 25/04*        (2006.01)
    *B62D 29/00*        (2006.01)
    *G03B 29/00*        (2006.01)

(52) U.S. Cl.
    CPC ................ *B60R 1/00* (2013.01); *B62D 25/04* (2013.01); *B62D 29/00* (2013.01); *G03B 29/00* (2013.01); *B60R 2300/202* (2013.01)

(58) Field of Classification Search
    CPC ................ B60R 2300/202; B60R 1/00; B60R 2011/0022; B62D 25/04; B62D 29/00
    See application file for complete search history.

(56) References Cited

U.S. PATENT DOCUMENTS

| | | | | |
|---|---|---|---|---|
| 6,607,239 B1* | 8/2003 | Fuji | ........................ | B60R 22/24 |
| | | | | 296/203.03 |
| 9,963,173 B2* | 5/2018 | Toyota | .................... | B62D 25/04 |
| 10,065,581 B2* | 9/2018 | Terada | .................... | B60R 13/08 |

FOREIGN PATENT DOCUMENTS

| | | |
|---|---|---|
| JP | 2016-1870 | 1/2016 |
| JP | 2017-100564 | 6/2017 |
| JP | 2017-114410 | 6/2017 |

* cited by examiner

*Primary Examiner* — William C. Dowling
(74) *Attorney, Agent, or Firm* — Oblon, McClelland, Maier & Neustadt, L.L.P.

(57) ABSTRACT

There is provided a vehicle pillar structure including: a non-transparent first supporting member that is configured by a material with a coefficient of linear thermal expansion along the length direction of a first value; a non-transparent second supporting member that is disposed spaced apart from the first supporting member, and that is configured by a material with a coefficient of linear thermal expansion along the length direction of a second value; and a resin transparent member that is configured by a material with a coefficient of linear thermal expansion along the length directions of the first supporting member and the second supporting member of a larger value than the first value and the second value, and that is configured including multiple glass fibers with length directions oriented such that fiber length directions are substantially orthogonal to the length directions of the first supporting member and the second supporting member.

8 Claims, 7 Drawing Sheets

VEHICLE PILLAR STRUCTURE

CROSS-REFERENCE TO RELATED APPLICATION

This application is based on and claims priority under 35 USC 119 from Japanese Patent Application No. 2017-226233 filed on Nov. 24, 2017, the disclosure of which is incorporated by reference herein.

BACKGROUND

Technical Field

The present invention relates to a vehicle pillar structure.

Related Art

Japanese Patent Application Laid-Open (JP-A) No. 2017-114410 discloses a structure in which a transparent resin member is employed in part of a vehicle front pillar where a blind spot of a driver is formed. Such a structure enables the driver to see outside the vehicle through the transparent portion, enabling the blind spot region of the driver to be reduced.

In the configuration disclosed in JP-A No. 2017-114410, a transparent resin member containing glass fibers (i.e. reinforced plastic) is employed in the transparent portion in order to increase the strength of the front pillar. Moreover, the structure of the transparent resin member is such that both front pillar transverse direction sides of the resin member are gripped between (fixed to) stronger, non-transparent resin members (supporting members).

Note that in the configuration disclosed in JP-A No. 2017-114410, boundary portions between the transparent resin member and the supporting members are joined together. In cases in which two types of materials are joined together as in such a configuration, the respective coefficient of linear thermal expansion of the members differ from each other, and so force acting in a direction separating the join occurs when there is a change in temperature. There is accordingly room for improvement in increasing the strength of front pillars configured including such a configuration.

SUMMARY

In consideration of the above circumstances, an object of the present invention is to obtain a vehicle pillar structure with a strong join between supporting members and a transparent resin member that contains glass fibers.

A vehicle pillar structure of a first aspect of the present invention includes a non-transparent first supporting member, a non-transparent second supporting member, and a resin transparent member. The first supporting member extends with a length direction thereof in a direction along a vehicle width direction end of windshield glass and is configured by a material with a coefficient of linear thermal expansion along the length direction of a first value. The second supporting member extends such that a length direction thereof is along a vehicle front end of a side door glass, is disposed spaced apart from the first supporting member, and is configured by a material with a coefficient of linear thermal expansion along the length direction of a second value. The transparent member is disposed spanning between the first supporting member and the second supporting member, is joined to length direction faces of the first supporting member and the second supporting member, is configured by a material with a coefficient of linear thermal expansion along the length directions of the first supporting member and the second supporting member of a larger value than the first value and the second value, and is configured including multiple glass fibers with length directions thereof oriented such that fiber length directions are substantially orthogonal to the length directions of the first supporting member and the second supporting member.

In the vehicle pillar structure of the first aspect of the present invention, the length directions of the glass fibers are oriented so as so be substantially orthogonal to the length directions of the first supporting member and the second supporting member (namely, are oriented toward a join face of the first supporting member and the resin transparent member (hereafter referred to as "transparent member" as appropriate) and toward a join face of the second supporting member and the transparent member). Note that multiple glass fibers are contained inside the transparent member. Specifically, the length directions of the multiple glass fibers are hence disposed so as to be mainly oriented toward the join faces of the respective supporting members and the transparent member (specifically, the join face between the first supporting member and the transparent member and the join face between the second supporting member and the transparent member).

Orienting the glass fibers toward the join faces of the transparent member and the respective supporting members in this manner enables coefficient of linear thermal expansion of the transparent member (coefficient of linear thermal expansion along a direction along the join faces of the transparent resin and the respective supporting members) to be kept low compared to cases in which glass fibers are not disposed in this manner.

When coefficient of linear thermal expansion of the transparent member can be kept low as described above, the rate at which the transparent member expands at the join to the respective supporting members due to temperature change is lower. This enables stress acting in a direction in which the transparent member and the supporting members separate from each other at the join to be kept low. This enables a vehicle pillar structure to be obtained that is less prone to separate at the join faces even when affected by a change in temperature, and that has a stronger join. Note that the range of being substantially orthogonal as referred to herein refers to a range in which the above-described operation and function of the vehicle pillar structure according to the first aspect of the present invention can be obtained.

A vehicle pillar structure of a second aspect of the present invention is the vehicle pillar structure of the first aspect, wherein the transparent member is disposed at a vehicle cabin inner side of a region where the first supporting member and the second supporting member oppose each other, and a transparent outer member is disposed at a vehicle cabin outer side of the region.

In the vehicle pillar structure of the second aspect of the present invention, the transparent member is disposed at the vehicle cabin inner side, and the transparent outer member is disposed at the vehicle cabin outer side of the region where the first supporting member and the second supporting member oppose each other. Namely, the transparent member and the outer transparent member are disposed so as to overlap each other as viewed from the driver's side. The driver is therefore able to see an object at the vehicle outside of the vehicle pillar through these two transparent members. The field of vision of the driver would normally be blocked by the vehicle pillar, and so the vehicle outside of the vehicle pillar becomes a blind spot as viewed by the driver. However, the vehicle pillar structure of the second aspect of the present invention enables this blind spot to be eliminated.

Moreover, employing two transparent members, these being the transparent member and the outer transparent member, in this manner enables the material for each transparent member to be selected according to their respective roles. Specifically, the range of selectable materials can be broadened such that a material (a resin member or the like) with high rigidity against bending is selected as the inner transparent member, and a material (reinforced glass or the like) with high strength (high hardness) against impact projectiles such as small stones is selected as the outer transparent member.

A vehicle pillar structure of a third aspect of the present invention is the vehicle pillar structure of the first aspect or the second aspect, wherein a cavity is configured between the transparent member and the outer member, and an image projector that is capable of projecting an image on the transparent member is installed in the cavity.

In the vehicle pillar structure of the third aspect of the present invention, images can be projected on the transparent member using the image projector. This enables the driver to obtain more visual information via the transparent member.

A vehicle pillar structure of a fourth aspect of the present invention is the vehicle pillar structure of the third aspect, wherein the image projector is disposed so as not to overlap with the transparent member as viewed by a driver.

In the vehicle pillar structure of the fourth aspect of the present invention, the vehicle pillar structure of the third aspect is configured such that the image projector is not disposed in a position blocking the field of vision of the driver, thereby enhancing the visibility of objects at the vehicle exterior for the driver.

A vehicle pillar structure of a fifth aspect of the present invention is the vehicle pillar structure of the third aspect or the fourth aspect, wherein the image projector projects on the transparent member light in which light components in a wavelength band where a refractive index of the glass fibers and a refractive index of just the resin configuring the transparent member differ from each other have been attenuated.

In the vehicle pillar structure of the fifth aspect of the present invention, the vehicle pillar structure of the third aspect or the fourth aspect is configured such that the image projector projects light in which light components in a wavelength band where a refractive index of the glass fibers and a refractive index of just the resin configuring the transparent member differ from each other have been attenuated. This enables projected images to be prevented from being displayed as blurred due to light refraction.

A vehicle pillar structure of a sixth aspect of the present invention is the vehicle pillar structure of any one of the third aspect to the fifth aspect, wherein the image projector projects on the transparent member display light that includes light polarized in a different direction from the length direction of the glass fibers and that carries information.

In the vehicle pillar structure of the sixth aspect of the present invention, an image configured by light (polarized light) vibrating with a wavelength orientation orthogonal to the length direction of the glass fibers is projected on the transparent member. Light incident to the transparent member is displayed as an image inside or on the surface of the transparent member by scattered reflection by the glass fibers.

Note that light is more likely to hit the glass fibers when an image configured by light with a wavelength orientation orthogonal to the length direction of the glass fibers is projected on the transparent member than when an image configured by light with a wavelength orientation parallel to the length direction of the glass fibers is projected on the transparent member. This enables more of the light to undergo scattering reflection. Namely, the brightness of the image displayed on the transparent member is increased. In other words, the visibility of a projected image can be increased when an image configured by light with a wavelength orientation orthogonal to the length direction of the glass fibers is projected on the transparent member compared to when an image configured by light with a wavelength orientation parallel to, the length direction of, the glass fibers is projected on the transparent member.

The vehicle pillar structure of the first aspect of the present invention enables a stronger vehicle pillar structure to be obtained.

The vehicle pillar structure of the second aspect of the present invention enables the visibility of objects at the vehicle exterior of the vehicle pillar for the driver to be enhanced.

The vehicle pillar structure of the third aspect of the present invention enables the driver to obtain more visual information via the transparent member included in the vehicle pillar.

The vehicle pillar structure of the fourth aspect of the present invention enables visibility of objects at the vehicle exterior of the vehicle pillar for the driver to be enhanced.

The vehicle pillar structure of the fifth aspect of the present invention enables the driver to see an even clearer display image through the transparent member included in the vehicle pillar.

The vehicle pillar structure of the sixth aspect of the present invention enables the driver to obtain more visual information through an even brighter image on the transparent member included in the vehicle pillar.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a vehicle pillar structure according to a first exemplary embodiment, with reference to the drawings. Note that in each of the drawings, the arrow FR indicates the vehicle front side and the arrow RH indicates the vehicle right side as appropriate. In the following explanation, unless specifically stated otherwise, reference to the front and rear, up and down, and left and right directions refers to front and rear in the vehicle front-rear direction, up and down in the vehicle vertical direction, and left and right when facing in the direction of travel.

The vehicle pillar structure according to the first exemplary embodiment is disposed so as to extend along a vehicle width direction outer end of windshield of a vehicle. Although each supporting member of the vehicle pillar structure according to the present exemplary embodiment is shaped such that its length direction is a direction along the vehicle width direction outer end of the windshield glass, a test piece 10 with a simplified structure is employed to explain the present exemplary embodiment.

Figure 1:
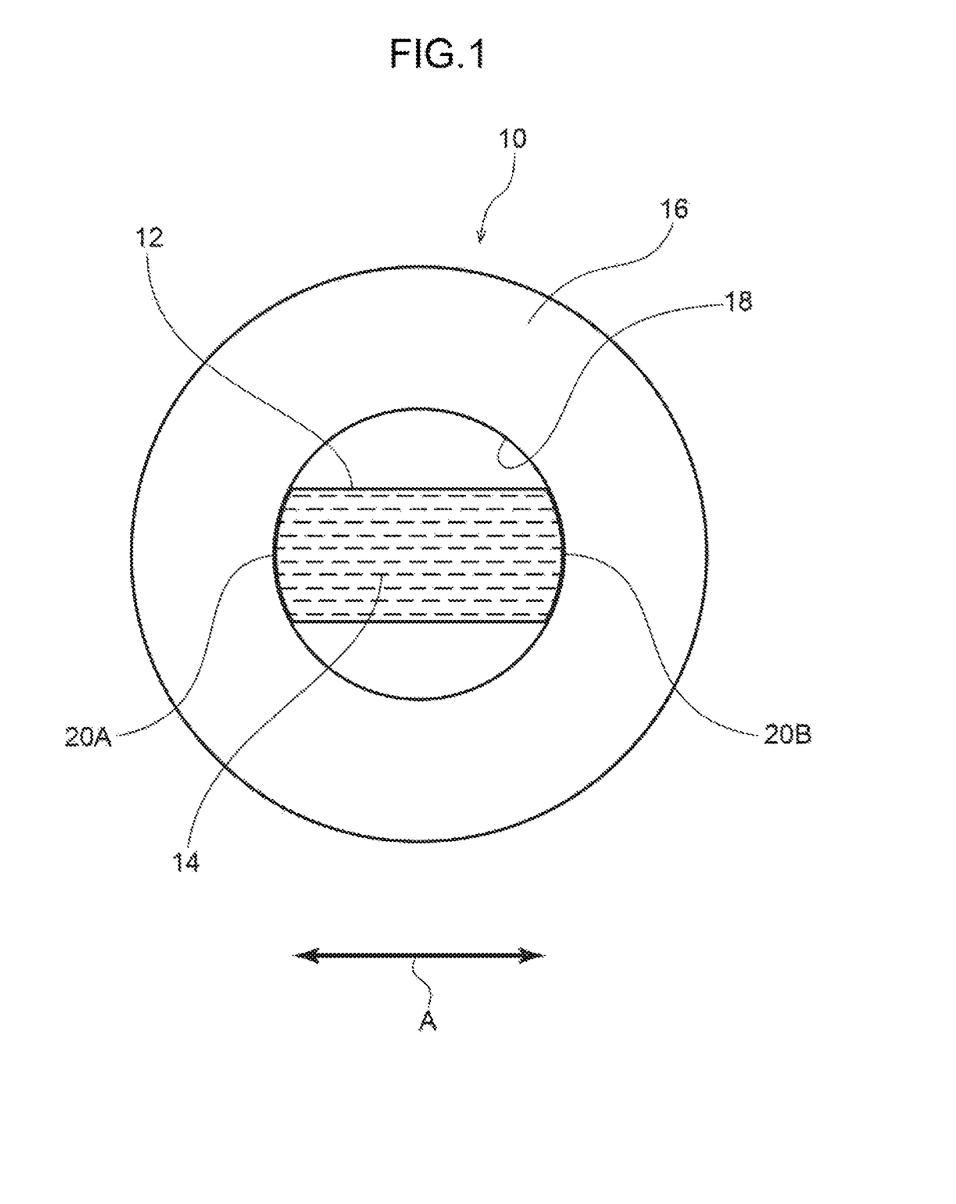
FIG. 1 schematically illustrates a test piece, in which respective join and placement relationships of a transparent member, glass fibers, and a supporting member are simply represented in a vehicle pillar structure according to a first exemplary embodiment.

FIG. 1 is a schematic diagram of the test piece 10 in which respective join and placement relationships of a transparent member 12, glass fibers 14, and a supporting member 16 as seen by a driver viewing a front pillar from the vehicle interior are simply represented. The length direction of the vehicle pillar structure according to the first exemplary embodiment is the top-bottom direction in. FIG. 1, and a transverse direction of the vehicle pillar structure is the left-right direction (arrow A direction) in FIG. 1.

As illustrated in FIG. 1, the vehicle pillar structure in the first exemplary embodiment is schematically represented by the test piece 10. In the test piece 10, two supporting members (a first supporting member and a second supporting member) are schematically represented using the single circular shaped supporting member 16. Note that a direction running along a vehicle width direction end of the windshield glass (a length direction of the first supporting member) and a direction running along a vehicle front side end of side door glass (a length direction of the second supporting member) are represented as the top-bottom direction in FIG. 1.

A transparent member containing glass fibers according to the first exemplary embodiment is represented by the transparent member 12 and the glass fibers 14 of the test piece 10. The transparent member 12 is joined to an inner wall 18 of the supporting member 16 at a left end join face 20A and a right end join face 20B. Multiple glass fibers 14 are contained inside the supporting member 16. Note that in FIG. 1, the length direction of the glass fibers 14 is oriented in a direction (arrow A direction) that substantially points toward the left end join face 20A and the right end join face 20B. In other words, the length direction of the glass fibers 14 is oriented in a direction that, is substantially at right angles to the length directions of the first supporting member and the second supporting member (the top-bottom direction in FIG. 1).

Note that a state in which the length direction of the glass fibers 14 is oriented in a direction pointing toward the join faces refers to a state in which a total sum of length components of the multiple glass fibers contained in the transparent member 12 in a direction pointing toward the left end join face 20A (and the right end join face 20B) is greater than a total sum of length components in a direction running along the join faces.

In the first exemplary embodiment, each glass fiber 14 is, envisaged to have an elongated profile with a length of approximately 1 mm to 2 mm, and an external diameter of approximately 10 µm to 15 µm. However, glass fibers that do not fit the envisaged profile are sometimes mixed in during the process of manufacturing the glass fibers 14, or during the process of arranging and dispersing the glass fibers 14 into the transparent member 12. Moreover, the length and external diameter of the glass fibers 14 are not limited to the above, and may be of any values within a range in which the operation and advantageous effects of the present invention are exhibited. For example, the length of the length direction of the glass fibers 14 may be approximately the same as a transparent member 12 in a direction substantially orthogonal to the length direction of the transparent member 12 (the top-bottom direction in FIG. 1).

In the first exemplary embodiment, a polycarbonate, an isosorbide-based polycarbonate, an amorphous polyamide, or the like may be employed as a candidate material for the transparent member 12.

In the first exemplary embodiment, carbon fiber reinforced plastic (CFRP), so-called high tensile steel, or the like may be employed as candidate materials for the supporting member 16. Note that high tensile steel refers to stainless steel with a tensile strength of approximately 490 MPa or above.

The materials employed in the first exemplary embodiment are examples from out of multiple candidate materials, and the material employed in the invention according to the first exemplary embodiment is not limited thereto.

Operation and Advantageous Effects

Explanation follows regarding operation of the first exemplary embodiment.

Figure 3:
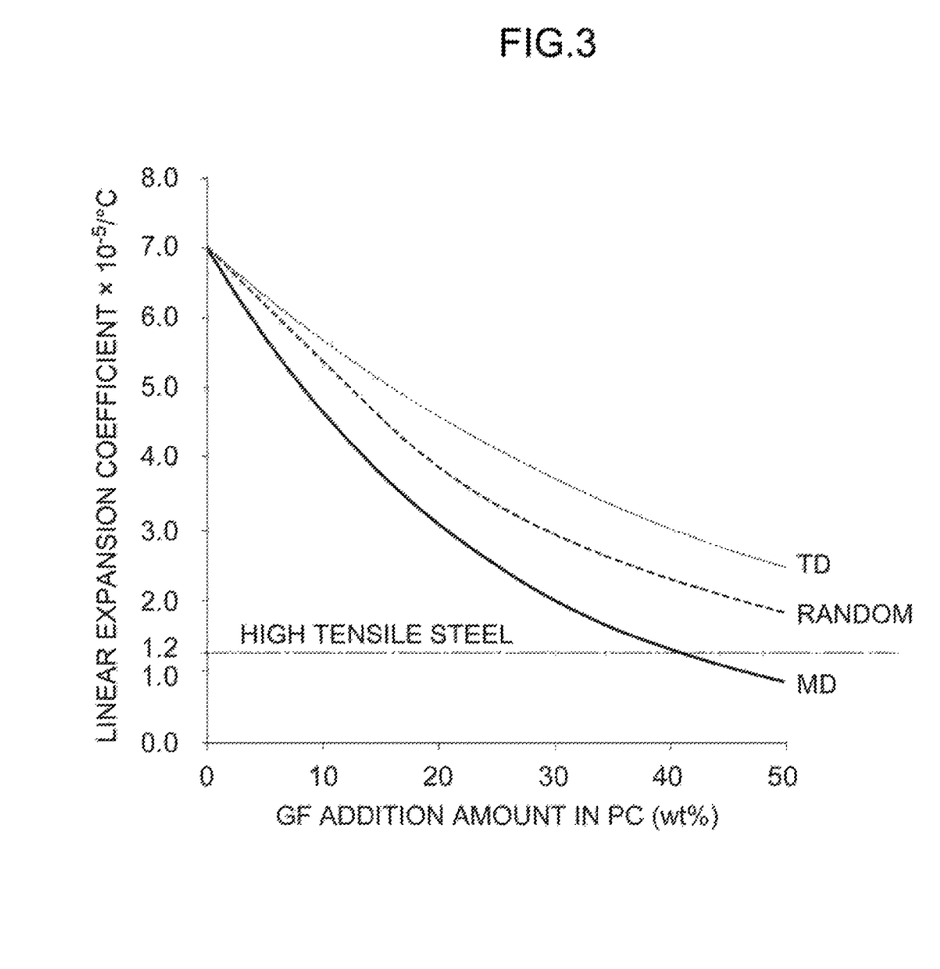
FIG. 3 is a graph illustrating a relationship between a glass fiber addition amount and a coefficient of linear thermal expansion in the first exemplary embodiment.

First, explanation follows regarding a method of controlling coefficient of linear thermal expansion of transparent resin by varying the direction of arrangement and addition amount of glass fibers arranged in the transparent resin, with reference to FIG. 3.

The graph of FIG. 3 illustrates measurement data for coefficient of linear thermal expansion plotted against an addition amount and orientation of glass fibers in a transparent member (polycarbonate) having glass fibers arranged therein. Values indicated by MD (machine direction) and TD (transverse direction) in the graph illustrate measurement values of coefficient of linear thermal expansion for test pieces in which multiple glass fibers contained in a polycarbonate are arranged such that their length directions are oriented in a specific given direction. Specifically, the MD values in the graph refer to values of coefficient of linear thermal expansion measured along the length direction of the glass fibers when measuring coefficient of linear thermal, expansion of the polycarbonate. The TD values refer to values of coefficient of linear thermal expansion measured along a direction orthogonal to the length direction of the glass fibers.

In the graph of FIG. 3, "random" represents measured values for a polycarbonate that contains multiple glass fibers arranged without controlling which direction their length directions is oriented in. Specifically, "random" refers to measurement values of coefficient of linear thermal expansion along a randomly selected direction for a polycarbonate containing multiple randomly arranged glass fibers.

As illustrated in the graph of FIG. 3, the values of coefficient of linear thermal expansion decrease as the addition amount of glass fibers in the polycarbonate increases in the results for all of TD, MD, and "random". Moreover, the values of coefficient of linear thermal expansion in the TD are greater than the values of coefficient of linear thermal expansion in the MD across the entire graph. Note that the "random" values of coefficient of linear thermal expansion are values falling between the TD values and the MD values.

An example of a coefficient of linear thermal expansion for high tensile steel is depicted as a reference value in the graph of FIG. 3. As illustrated in FIG. 3, in cases in which glass fibers are not added to the polycarbonate, the values of coefficient of linear thermal expansion for polycarbonate are, greater than the value of coefficient of linear thermal expansion for high tensile steel. However, as the addition amount of the arranged glass fibers increases, the values of coefficient of linear thermal expansion of the polycarbonate drop accordingly so as to approach the value of coefficient of linear thermal expansion for high tensile steel. Note that the graph illustrates that the proportional drop in coefficient of linear thermal expansion tends to be greater for coefficient of linear thermal expansion along the MD than for coefficients of linear thermal expansion in the TD or "random". In other words, when glass fibers are arranged in a polycarbonate, disposing the length direction of the glass fibers in a direction orthogonal to the direction coefficient of linear thermal expansion will be measured in enables the measured values to be reduced.

The vehicle pillar structure according to the first exemplary embodiment thereby obtains the following advantageous effects.

In a vehicle pillar structure including a structure in which the transparent member (polycarbonate) 12 and the supporting member (CFRP, high tensile steel, or the like) 16 are joined together, the joined members either expand or contract according to their specific coefficient of linear thermal expansion when a change in temperature has occurred. Note that in cases in which expansion rates of two joined members differ in a direction along their join faces, stress occurs a direction to shear the join faces, such that the join faces are prone to separate. Namely, the strength of the join is reduced.

Note that polycarbonate, which has a high coefficient of linear thermal expansion, expands or contracts more than CFRP or high tensile steel as temperature changes. Thus, comparatively large stress tends to act in the vicinity of the join in a direction to shear the join faces.

However, in the vehicle pillar structure according to the first exemplary embodiment, the length direction of the glass fibers is oriented so as to, substantially point toward the join faces between the transparent member and the supporting member. Thus the coefficient of linear thermal expansion of the transparent member in a direction along the join faces is controlled so as to decrease to a value close to that of the supporting member. This enables a difference in expansion rates of the two members at the join faces to be kept small. Stress acting in a direction to shear the join faces is thereby suppressed from occurring, and the strength at the join location is raised.

Test

Explanation follows regarding results of a test to investigate the strength of the join location between the transparent member 12 arranged with the glass fibers 14 and the supporting member 16, with reference to FIG. 1 and FIG. 3.

First, explanation follows regarding the test piece employed in the test. The test piece 10 illustrated in FIG. 1 is employed in the test. The supporting member 16 of the test piece 10 is a high tensile steel with a shape measured according to the test method for the Evaluation of the Adhesion Interface Performance in Plastic-Metal Assemblies as stipulated in ISO 19095-2, Type D. Specifically, the supporting member 16 has a circular ring shape with an external diameter of approximately 55 mm and an internal diameter of approximately 20 mm. A high tensile steel with a coefficient of linear thermal expansion of approximately $1.2 \times 10^{-5}/°$ C. is employed.

The transparent member 12 disposed inside the supporting member 16 has an elongated shape with a width (the top-bottom direction in FIG. 1) of approximately 20 mm. A polycarbonate that has a coefficient of linear thermal expansion of approximately $7 \times 10^{-5}/°$ C. in a state without the glass fibers 14 arranged therein is employed as the transparent member 12. Both length direction ends of the transparent member 12 are joined to the inner side of the supporting member 16. Specifically, the join faces between the transparent member 12 and the supporting member 16 (the left end join face 20A and the right end join face 20B) are adhered using an epoxy-based adhesive.

The multiple glass fibers 14 inside the transparent member 12 are oriented such that their length directions are in a direction (the arrow A direction) substantially pointing toward the left end join face 20A and the right end join face 20B. The glass fibers 14 have an elongated profile with a length of approximately 1 mm to 2 mm and an external diameter of approximately 10 μm to 15 μm. Note that the ratio by which the glass fibers 14 are arranged respect to the polycarbonate is approximately 40%. The coefficient of linear thermal expansion of the transparent member 12 in the direction along the join faces after the glass fibers 14 have been arranged is approximately $1.4 \times 10^{-5}/°$ C.

Explanation follows regarding the test method. In a single cycle of the test, the above-described test piece 10 was cooled to −30° C. and maintained in this state for one hour, after which the test piece 10 was heated to 80° C. and then maintained in this state for one hour. This cycle was repeated 100 times during testing. This test was performed on five test pieces and the state of separation at the left end join face 20A and the right end join face 20B checked.

The test results, of the test are listed in Table 1.

TABLE 1

| | Test Results |
|---|---|
| Reference Example | All five out of five test pieces separated Average cycle at separation: $15^{th}$ cycle |
| Test Piece 10 | No separation |
| Test Piece 110 | Four out of five test pieces separated Average cycle at separation: $60^{th}$ cycle |

As illustrated in Table 1, separation was not observed for the test piece 10 in any of the five test pieces.

Explanation follows regarding a test method and results for a reference example and a test piece 110 according to a comparative example, performed for the purposes of comparison. Note that in the comparative example, explanation is omitted regarding parts that are common to or duplicates of those in the test piece 10.

As illustrated in Table 1, in the reference example test, a transparent member not containing glass fibers was tested under the same conditions as when testing the test piece 10. In the test results for the reference example, all five test pieces tested separated at the join faces. The average cycle when separation occurred was the 15$^{th}$ cycle.

Figure 2:
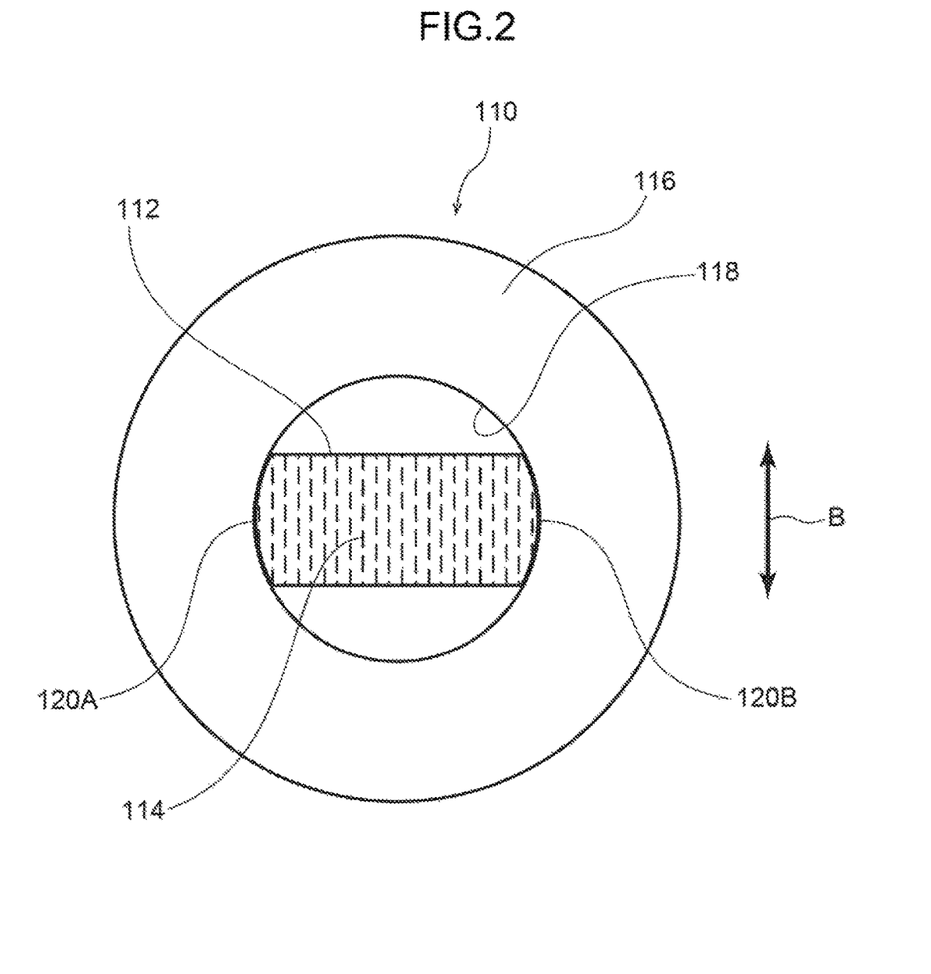
FIG. 2 schematically illustrates a test piece in which respective join and placement relationships of a transparent member, glass fibers, and a supporting member, are simply represented in a vehicle pillar structure according to a reference example.

The test results of the test piece 110 illustrated in Table 1 are the results of testing the test piece 110 illustrated in FIG. 2 using the same test as that performed on the test piece 10.

As illustrated in FIG. 2, the test piece 110 is configured such that a transparent member 112 is joined to an inner wall 118 of a supporting member 116 at a left end join face 120A and a right end join face 120B. Note that the dimensions and materials of the supporting member 116, the transparent member 112 and glass fibers 114 of the test piece 110 are the same as the corresponding members of the test piece 10.

Note that the glass fibers 114 are arranged in the transparent member 112 such that their length directions are in a direction (arrow B direction) running along the left end join face 120A and the right end join face 120B. Note that the coefficient of linear thermal expansion of the transparent member 112 in the direction miming along the join faces after the glass fibers 14 have been arranged is approximately $3.3 \times 10^{-5}$/° C.

The test piece 110 was tested under the same conditions as when testing the test piece 10. As illustrated in Table 1, in the test results for the test piece 110, the join faces of four out of the five tested test pieces separated. The average cycle when separation occurred was the 60$^{th}$ cycle.

The above test results confirm that the join strength between the transparent member and the supporting member is higher in the test piece 10 than in both the reference example and the test piece 110. Namely, investigation into the test piece 10 has confirmed the advantageous effects from increasing the strength at the join location in the vehicle pillar structure according to the first exemplary embodiment.

Second Exemplary Embodiment

Explanation follows regarding a vehicle pillar structure according to a second exemplary embodiment. Note that corresponding reference numbers are appended to similar configuration to that in the first exemplary embodiment and explanation thereof is omitted as appropriate.

Figure 4:
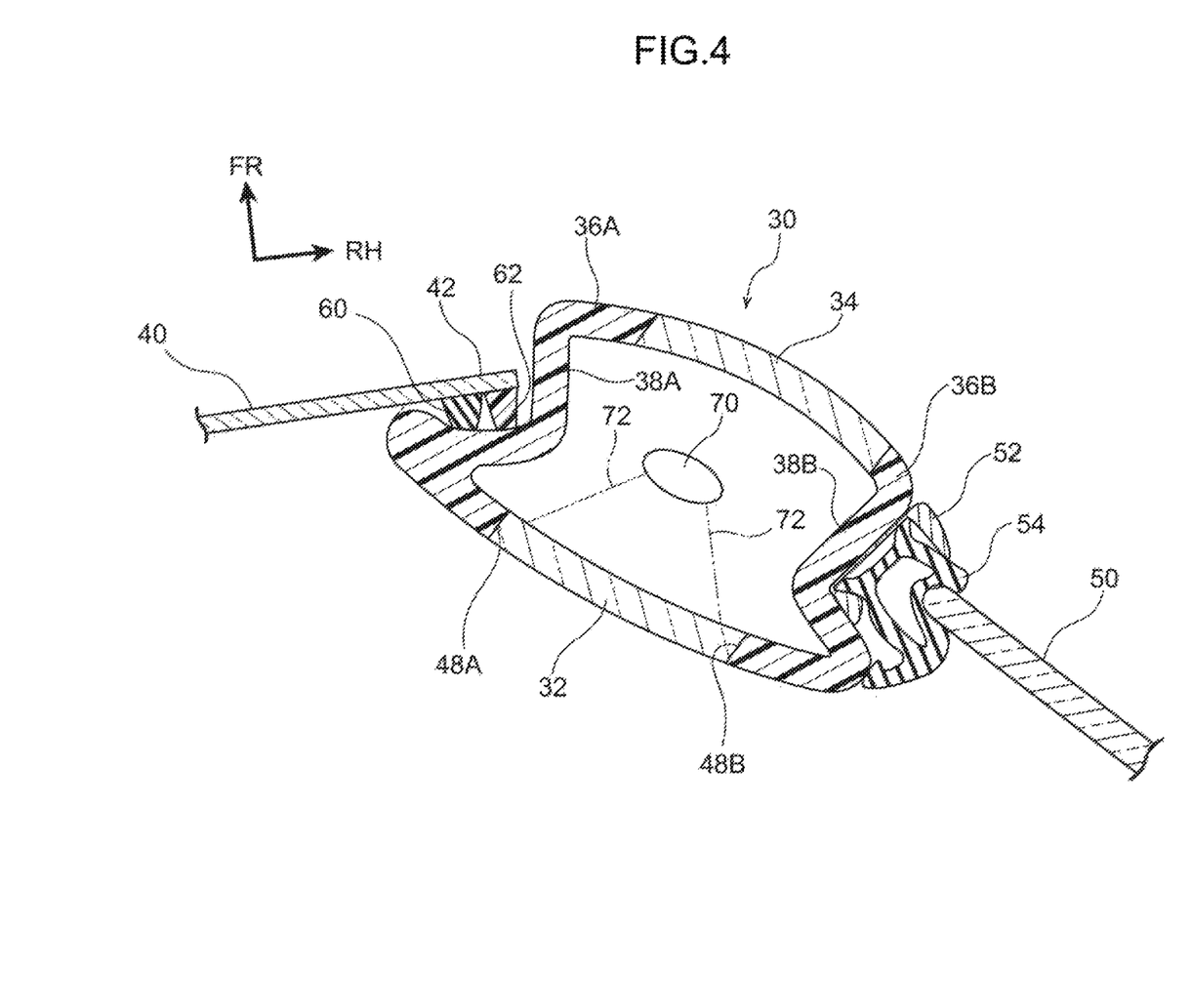
FIG. 4 is a plan cross-section view illustrating a vehicle pillar structure according to a second exemplary embodiment.

FIG. 4 illustrates a vehicle pillar structure 30 according to the second exemplary embodiment. In the second exemplary embodiment, a vehicle pillar structure 30 disposed at a front-right end section of a vehicle is given as an example.

As illustrated in FIG. 4, the vehicle pillar structure 30 has a substantially elliptical shaped closed cross-section profile that has its length direction following a side end of a windshield glass 40 and a side end of a side door glass 50 in plan cross-section view. The closed cross-section is configured including a front supporting member 36A serving as a first supporting member positioned on the windshield glass 40 side, and a rear supporting member 36B serving as a second supporting member positioned on the side door glass side so as to face the front supporting member 36A. A transparent member 32 is disposed between vehicle inner ends of the front supporting member 36A and the rear supporting member 36B. Similarly, an outer transparent member 34 is disposed between vehicle outer ends of the front supporting member 36A and the rear supporting member 36B. A substantially elliptical shaped closed cross-section is formed by an outline formed by the front supporting member 36A, the rear supporting member 36B, the transparent member 32, and the outer transparent member 34.

A location where a side wall 38A of the front supporting member 36A retains the windshield glass 40 is recessed in an inverted, substantially L shape. An adhesive 60 is applied between the side wall 38A and the windshield glass 40, such that a vehicle width direction outer end 42 of the windshield glass and the front supporting member 36A are fixed together. Note that molding 62 is disposed further to the vehicle width direction outer side than the adhesive 60 so as to fill in a gap between the windshield glass 40 and the front supporting member 36A.

A location where a side wall 38B of the rear supporting member 36B retains the side door glass 50 is recessed in substantially an L shape. A retainer 52 and a door seal 54 are interposed between the side wall 38B and the side door glass.

The retainer 52 is formed by bending belt-shaped stainless steel or the like. As illustrated in FIG. 4, the retainer 52 is substantially U-shaped with a recess opening toward the side door glass in plan cross-section view. The retainer 52 is fixed to the rear supporting member 36B by fastening members such as screws, not illustrated in the drawings. The door seal 54 is disposed between the retainer 52 and the side door glass 50. The door seal 54 is attached to the retainer 52.

The transparent member 32 and the outer transparent member 34 are disposed opposing each other and are also disposed so as to overlap each other as viewed by the driver. Namely, the driver is able to see an object outside the vehicle through the transparent member 32 and the outer transparent member 34.

Note that the transparent member 32 contains multiple glass fibers (not illustrated in the drawings) that are disposed so as to point toward a join face 48A with the front supporting member 36A and a join face 48B with the rear supporting member 36B.

As illustrated in FIG. 4, the vehicle pillar structure 30 according to the second exemplary embodiment is also configured including an image projector 70. The image projector 70 projects images onto the transparent member 32. Note that the image projector 70 is positioned between the outer transparent member 34 and the transparent member 32 in plan cross-section view. In plan cross-section view, a projection range 72 of the image projector 70 is a range between the left end join face 48A and the right end join face 48B of the transparent member 32.

The image projector 70 is disposed so as to not to overlap the transparent member 32 as viewed by the driver. More specifically, the image projector 70 is disposed below the transparent member 32 (toward the vehicle floor) and is installed so as to project images upward (toward the vehicle ceiling) as viewed by the driver.

Note that in the vehicle pillar structure 30 according to the second exemplary embodiment, the image projector 70 projects light in which light in wavelength regions where a refractive index of the glass fibers arranged in the transparent member 32 differs from a refractive index of the transparent member has been attenuated.

Operation and Advantageous Effects

Explanation follows regarding operation of the second exemplary embodiment.

In the configuration of the second exemplary embodiment, the length directions of the multiple glass fibers contained in the transparent member 32 point toward the join faces 48A and 48B. The strength at join locations to the front supporting member 36A and to the rear supporting member 36B is thereby increased, similarly to in the first exemplary embodiment.

The vehicle pillar structure 30 according to the second exemplary embodiment includes two transparent members, these being the outer transparent member 34 and the transparent member 32. This enables the transparent members to be selected according to their respective roles. Specifically, the range of selectable materials can be broadened such that a material with high rigidity against bending is selected as the inner transparent member 32, and a material with high strength (high hardness) against impact of projectiles such as small stones is selected as the outer transparent member 34.

The outer transparent member 34 and the transparent member 32 are disposed so as to overlap each other as viewed by the driver. This enables the driver to see objects outside the vehicle through these two transparent members.

The vehicle pillar structure 30 according to the second exemplary embodiment also includes the image projector 70 that projects images onto the transparent member 32. The driver is able to obtain even more visual information by viewing displayed images projected on the transparent member 32. Note that since the image projector 70 is disposed so as not to overlap the transparent member 32 as viewed by the driver, the driver can obtain visual information without their field of vision being impeded by the image projector 70.

The image projector 70 of the second exemplary embodiment projects light in which light in wavelength regions where the refractive index of the glass fibers arranged in the transparent member 32 differs from the refractive index of the transparent member 32 has been attenuated. Explanation follows regarding operation and advantageous effects of the present configuration, with reference to the graph illustrated in FIG. 5.

Figure 5:
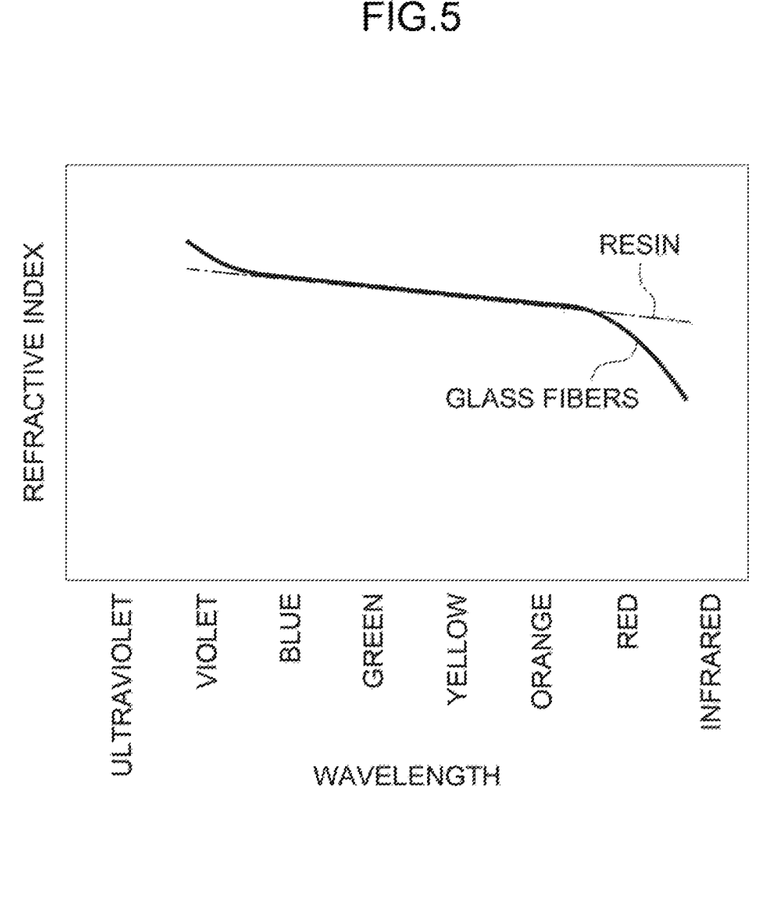
FIG. 5 is a graph illustrating a relationship between wavelength bands of light and refractive indices of resin and glass fibers in the second exemplary embodiment.

The graph in FIG. 5 illustrates relationships between wavelengths of light and the refractive indices of resin and glass fibers. The graph illustrates that the refractive indices of glass fibers and of resin differ greatly for light in a long wavelength (red) region and in a short wavelength (violet) region. Thus, a phenomenon is seen in which a double image or blurred image arises in cases in which light in these regions is projected on the transparent member 32 of the second exemplary embodiment.

To address this, the image projector 70 of the second exemplary embodiment projects light in which light in the long wavelength (red) region and light in the short wavelength (violet) region has been attenuated. This enables the driver to view sharper images.

Note that in cases in which the temperature of the vehicle pillar structure according to the second exemplary embodiment has changed, the transparent member 32 expands or contracts according to its specific coefficient of linear thermal expansion. In such cases, the regions in which a divergence in the refractive indices in the graph in FIG. 5 occurs are shifted so as to be nearer to the medium wavelength (nearer the center of the graph).

Note that in the second exemplary embodiment, the length direction of the glass fibers contained in the transparent member 32 is oriented in a direction substantially pointing toward the join face 48A and the join face 48B. Thus, the coefficient of linear thermal expansion of the transparent member 32 in the direction substantially opposing the front supporting member 36A and the rear supporting member 36B is kept small. Namely, expansion of the transparent member 32 is suppressed, and the occurrence of internal stress is reduced. This enables the regions where there is a divergence in the refractive indices of the resin and the glass fibers in the graph of FIG. 5 to be suppressed from widening. In other words, changing the direction of the glass fibers inside the resin enables internal stress in the resin that occurs in a given direction when the temperature has changed to be reduced, thereby enabling control of the wavelength regions where there is a difference in the refractive indices of the resin and the glass fibers.

Third Exemplary Embodiment

Explanation follows regarding a vehicle pillar structure according to a third exemplary embodiment. Note that corresponding reference numbers are appended to similar configuration to that in the first exemplary embodiment and second exemplary embodiment, and explanation thereof is omitted as appropriate.

The vehicle pillar structure according to the third exemplary embodiment is the second exemplary embodiment configured such that the image projector 70 projects onto the transparent member 32 an image configured by light (polarized light) with a wavelength orientation orthogonal to the length direction of the glass fibers contained in the transparent member 32.

Operation and Advantageous Effects

Figure 6:
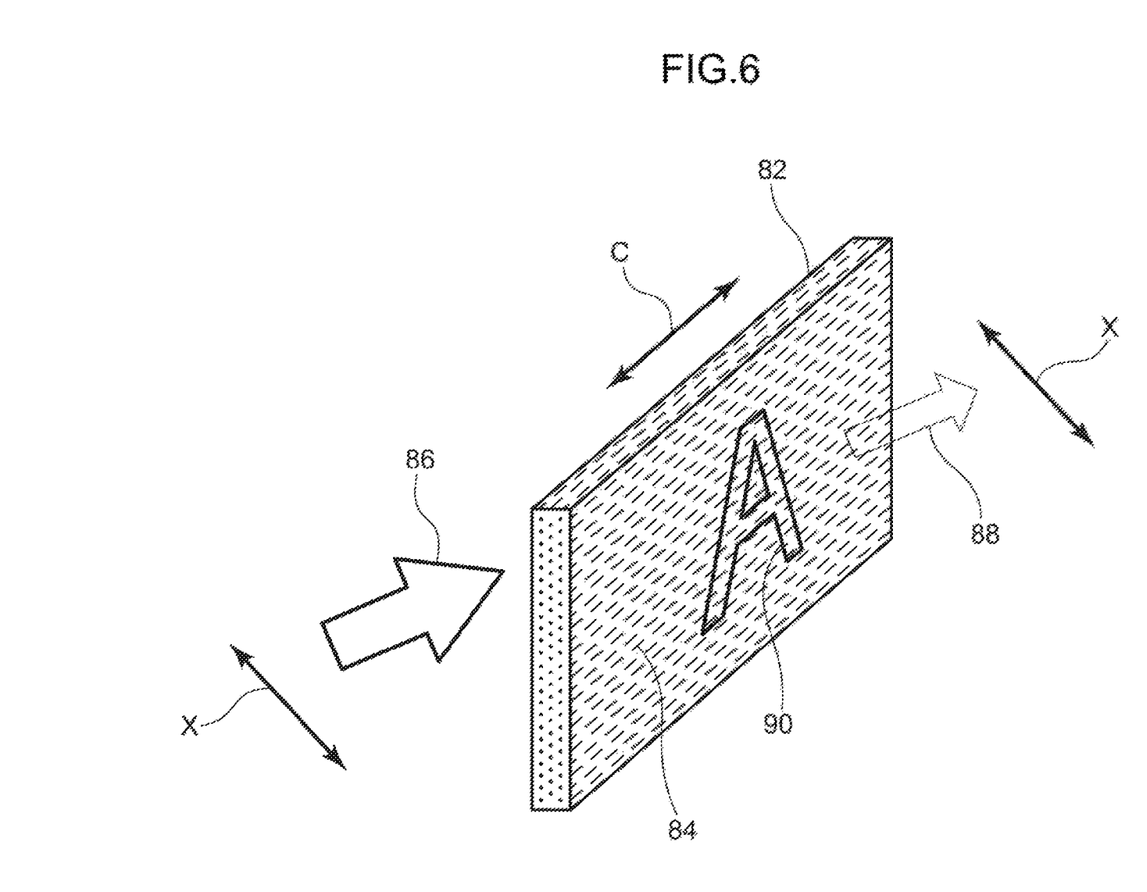
FIG. 6 schematically illustrates a relationship between transmitted light and a display image in a third exemplary embodiment.
Figure 7:
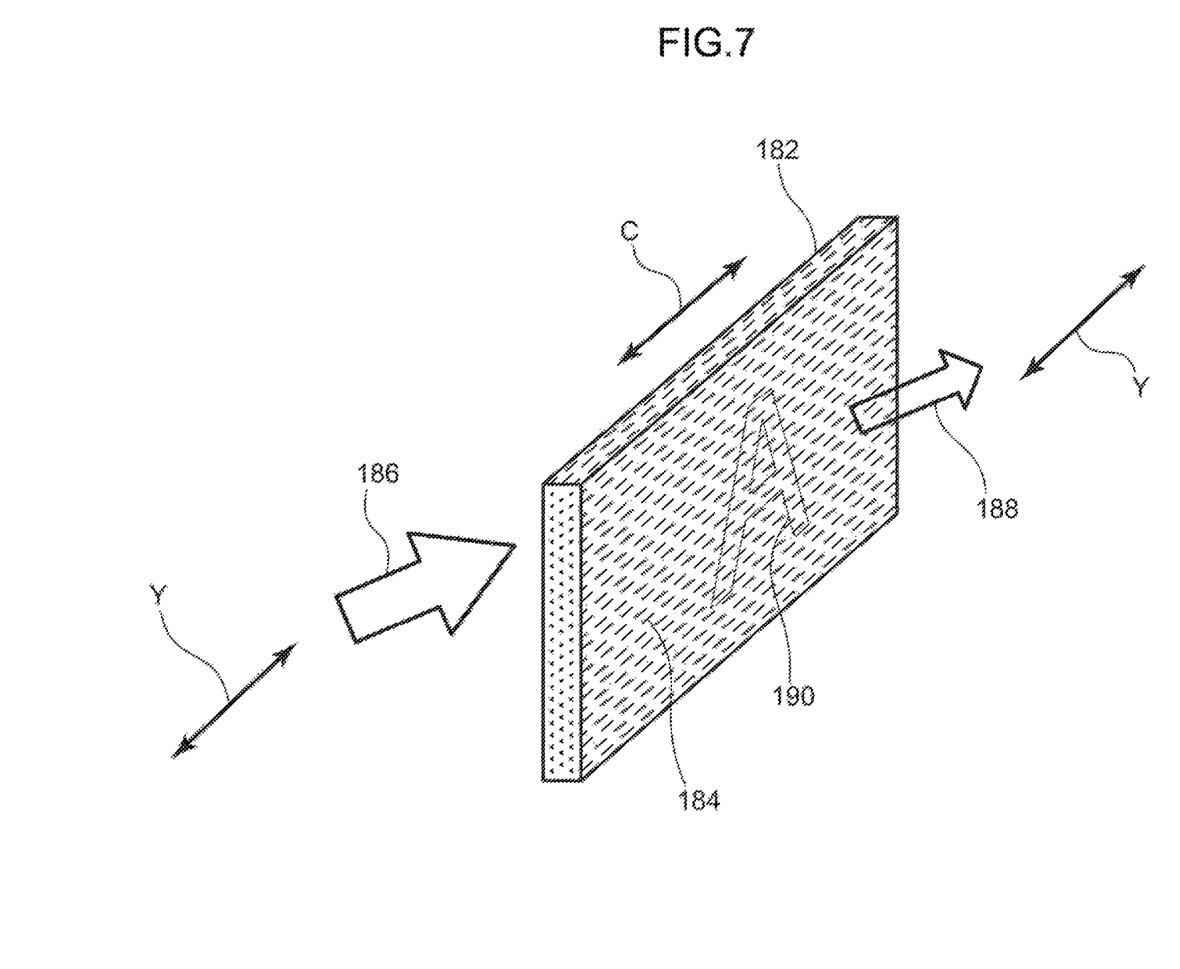
FIG. 7 schematically illustrates a relationship between transmitted light and a display image in a reference example.

Explanation follows regarding operation of the third exemplary embodiment, with reference to FIG. 6 and FIG. 7.

FIG. 6 schematically illustrates a relationship between transmitted light 88 and display light 90 in the third exemplary embodiment. A transparent member 82 in FIG. 6 contains glass fibers with their length directions oriented in the arrow C direction. In contrast thereto, an oscillation orientation of polarized light 86 (incident light) projected from an image projector (not illustrated in the drawings) is in the arrow X direction (a direction orthogonal to the arrow C direction).

The polarized light 86 hits glass fibers 84 inside the transparent member 82 and undergoes scattered reflection. As described above, the oscillation orientation of the polarized light 86 and the direction in which the glass fibers 84 are disposed are orthogonal to each other. This provides more opportunities for the polarized light 86 to hit the glass fibers 84. The brightness of the display light 90 displayed on the transparent member 32 is increased as a result. Note that the transmitted light 88 indicates light components that have passed through the transparent member 82 without being scattering reflected by the glass fibers 84.

FIG. 7 schematically illustrates a relationship between transmitted light 188 and displayed image 190 in a reference example. A transparent member 182 in FIG. 7 includes glass fibers with their length directions oriented in the arrow C direction. In contrast thereto, an oscillation orientation of polarized light 186 (incident light) projected from an image projector (not illustrated in the drawings) is in the arrow Y direction (a direction parallel to the arrow C direction).

The polarized light 186 hits glass fibers 184 inside the transparent member 182 and undergoes scattered reflection. As described, above, the oscillation orientation of the polarized light 186 and the direction in which the glass fibers 184 are oriented are parallel to each other. The opportunities for the polarized light 186 to hit the glass fibers 184 are therefore less than in the third exemplary embodiment. The brightness of the displayed image 190 displayed on the transparent member 182 is therefore lower than in the third exemplary embodiment. Note that the transmitted light 188 indicates light components that have passed through the transparent member 182 without being scattering reflected by the glass fibers 184.

Vehicle pillar structures according to various exemplary embodiments have been explained above; however, various modifications may obviously be implemented within a range not departing from the spirit of the present invention. For example, the shape of the transparent member is not necessarily flat, and may be curved to some extent. Similarly, the cross-section profile of the transparent member may have be a convex face, or may include bulging protrusion shapes or a recesses. Moreover, undulations may be provided on the surface of the transparent member.

What is claimed is:

1. A vehicle pillar structure comprising:
   a non-transparent first supporting member that extends with a length direction thereof in a direction along a vehicle width direction end of a windshield glass, and that is configured by a material with a coefficient of linear thermal expansion along the length direction of a first value;
   a non-transparent second supporting member that extends such that a length direction thereof is along a vehicle front end of a side door glass, that is disposed spaced apart from the first supporting member, and that is configured by a material with a coefficient of linear thermal expansion along the length direction of a second value; and
   a resin transparent member that is disposed spanning between the first supporting member and the second supporting member, that is joined to length direction faces of the first supporting member and the second supporting member, that is configured by a material with a coefficient of linear thermal expansion along the length directions of the first supporting member and the second supporting member of a larger value than the first value and the second value, and that is configured including multiple glass fibers with length directions thereof oriented such that fiber length directions are substantially orthogonal to the length directions of the first supporting member and the second supporting member.

2. The vehicle pillar structure of claim 1, wherein:
   the transparent member is disposed at a vehicle cabin inner side of a region where the first supporting member and the second supporting member oppose each other; and
   a transparent outer member is disposed at a vehicle cabin outer side of the region.

3. The vehicle pillar structure of claim 2, wherein:
   a cavity is configured between the transparent member and the outer member; and
   an image projector that is capable of projecting an image on the transparent member is installed in the cavity.

4. The vehicle pillar structure of claim 3, wherein the image projector is disposed so as not to overlap with the transparent member as viewed by a driver.

5. The vehicle pillar structure of claim 3, wherein the image projector projects on the transparent member light in which light components in a wavelength band where a refractive index of the glass fibers and a refractive index of just the resin configuring the transparent Member differ from each other have been attenuated.

6. The vehicle pillar structure of claim 3, wherein the image projector projects on the transparent member display light that includes light polarized in a different direction from the length direction of the glass fibers and that carries information.

7. The vehicle pillar structure of claim 2, wherein the transparent outer member has a greater hardness than the transparent member.

8. The vehicle pillar structure of claim 2, wherein the transparent member has a higher rigidity against bending than the transparent outer member.

* * * * *